(12) United States Patent
Gomez et al.

(10) Patent No.: US 9,225,373 B2
(45) Date of Patent: *Dec. 29, 2015

(54) SCALABLE ARCHITECTURE FOR SATELLITE CHANNEL SWITCH

(75) Inventors: Ramon Gomez, San Juan Cap, CA (US); Tommy Yu, Orange, CA (US)

(73) Assignee: Broadcom Corporation, Irvine, CA (US)

(*) Notice: Subject to any disclaimer, the term of this patent is extended or adjusted under 35 U.S.C. 154(b) by 667 days.

This patent is subject to a terminal disclaimer.

(21) Appl. No.: 13/550,484

(22) Filed: Jul. 16, 2012

(65) Prior Publication Data

US 2012/0281788 A1 Nov. 8, 2012

Related U.S. Application Data

(63) Continuation of application No. 12/337,046, filed on Dec. 17, 2008, now Pat. No. 8,224,274.

(60) Provisional application No. 61/006,186, filed on Dec. 28, 2007.

(51) Int. Cl.
*H03M 1/12* (2006.01)
*H04B 1/18* (2006.01)

(52) U.S. Cl.
CPC .................................. *H04B 1/18* (2013.01)

(58) Field of Classification Search
USPC ............ 455/179.1, 130, 188.1, 139; 341/144, 341/155
See application file for complete search history.

(56) References Cited

U.S. PATENT DOCUMENTS

| | | |
|---|---|---|
| 6,845,424 B2 | 1/2005 | Casper et al. |
| 6,940,442 B2 | 9/2005 | Van Schendel et al. |
| 7,130,576 B1 | 10/2006 | Gurantz et al. |
| 7,730,514 B1 | 6/2010 | Zhang et al. |
| 7,896,807 B2 | 3/2011 | Clancy et al. |
| 2006/0083335 A1 | 4/2006 | Seendripu et al. |
| 2009/0168924 A1 | 7/2009 | Gomez et al. |
| 2010/0067431 A1 | 3/2010 | McNeely |

*Primary Examiner* — Peguy Jean Pierre
(74) *Attorney, Agent, or Firm* — Sterne, Kessler, Goldstein & Fox P.L.L.C.

(57) ABSTRACT

A frequency translation module for a broadband multi-channel communication system may include an analog signal converter, a digital channel selection device, and a digital-to-analog (D/A) converter. The analog signal converter is configured to receive a plurality of analog signals, to select analog signals residing in a predefined frequency band, and to convert each of the selected analog signals into a digital signal. The digital channel selection device is configured to process digital signals corresponding to the selected analog signals and to generate a composite output of digital signals representative of the selected analog signals. The D/A converter is configured to translate the composite output to an analog signal output decodable by a receiver. Further, the frequency translation module may include a mixer configured to upconvert the analog signal output to a frequency decodable by the receiver.

22 Claims, 17 Drawing Sheets

SCALABLE ARCHITECTURE FOR SATELLITE CHANNEL SWITCH

CROSS REFERENCE TO RELATED APPLICATION

This application is a continuation of U.S. application Ser. No. 12/337,046, now allowed, which claims the benefit of U.S. Provisional Application No. 61/006,186, filed Dec. 28, 2007, and titled "Scalable Architecture for Satellite Channel Switch," all of which are incorporated herein by reference in their entirety.

BACKGROUND

1. Field

The present invention generally relates to the field of channel switches in a multi-channel communication system. More specifically, the present invention relates to processing one or more input channels to a frequency translation module through a scalable switch architecture.

2. Background

A growing portion of television programming is broadcast directly to home receivers via satellite. Satellite television provides a wide array of programming and is broadcasted from various orbital positions in space. Satellite antennas receive signals from these specific orbital locations. Integrated receiver decoders (IRD) decode the signals received by the antenna signals and pass them to a television for viewing. Oftentimes, households subscribe to additional satellite programs, such as high-definition and specialized programming, where multiple antennas may be required to receive broadcasts from satellites in different orbital locations. The broadcast signal from each satellite may contain a number of distinct bands based on, for example, frequency and polarization. Alternatively, a single antenna (e.g., satellite dish) may be used to receive broadcast signals from the different satellites.

A frequency translation module (FTM) enables a user to selectively switch the signals received from each satellite antenna and deliver these signals to an IRD located within a household. Conventional FTMs contain one or more tuners, where each tuner is coupled to one satellite antenna. The tuner selects and down-converts a desired channel from the satellite signal to an intermediate frequency (IF) signal or a baseband signal, which is suitable for processing and display on a television or computer monitor. Conventional approaches to the design of tuners employ analog components, such as fixed-frequency filters, mixers, and local oscillators. Consequently, FTMs require extensive hardware, including at least one oscillator and one mixer for each tuner, making the module costly and too large for some applications. Furthermore, as the channel capacity of a FTM grows, the module consumes more power due to the increase in analog components.

What is needed is a method or apparatus for implementing a scalable switch architecture for a FTM that minimizes circuit area and power consumption.

SUMMARY

In order to reduce circuit area and power consumption as the capacity of FTMs grow, digital frequency converters and filters, which are compact in modern integrated circuit technology and consume less power than their analog counterparts, may be used to implement a scalable FTM architecture. In an embodiment of the present invention, a frequency translation module for a broadband multi-channel communication system may include the following: an analog signal converter configured to receive a plurality of analog signals, to select analog signals residing in a predefined frequency band, and to convert each of the selected analog signals into a digital signal; a digital channel selection device configured to process digital signals corresponding to the selected analog signals and to generate a composite output of digital signals representative of the selected analog signals; and, a digital-to-analog (D/A) converter configured to translate the composite output to an analog signal output decodable by a receiver. The frequency translation module may also include a mixer configured to upconvert the analog signal output to a frequency decodable by the receiver.

In another embodiment, a method of switching channels on a broadband multi-channel communication system with a scalable switch architecture may include the following steps: (1) receiving a plurality of analog signals; (2) selecting analog signals whose frequency resides in a predefined frequency band of the communication system; (3) converting each of the selected analog signals into a digital signal; (4) processing the digital signal, corresponding to each of the selected analog signals, into a composite output of digital signals; and, (5) translating the composite output to an analog signal output decodable by a receiver. The method may further include upconverting the analog signal output to a frequency decodable by the receiver.

In another embodiment, a system for switching channels on a broadband multi-channel communication system with a scalable switch architecture may include an antenna, a FTM, a processor, and a memory. The FTM may receive signals through the antenna. Further, the processor may control the operation of the FTM. The memory is in communication with the processor and may store processing instructions. These processing instructions may include directing the processor to perform the following functions: receive a plurality of analog signals; select analog signals whose frequency resides in a predefined frequency band of the communication system; convert each of the selected analog signals into a digital signal; process the digital signal, corresponding to each of the select analog signals, into a composite output of digital signals; and, translate the composite output to an analog signal output decodable by a receiver. The processing instruction may also include directing the processor to upconvert the analog signal output to a frequency decodable by the receiver.

Further embodiments, features, and advantages of the present invention, as well as the structure and operation of the various embodiments are described in detail below with reference to accompanying drawings.

BRIEF DESCRIPTION OF THE DRAWINGS

The present invention is illustrated by way of example, and not by way of limitation, in the figures of the accompanying drawings in which.

DETAILED DESCRIPTION

Figure 1:
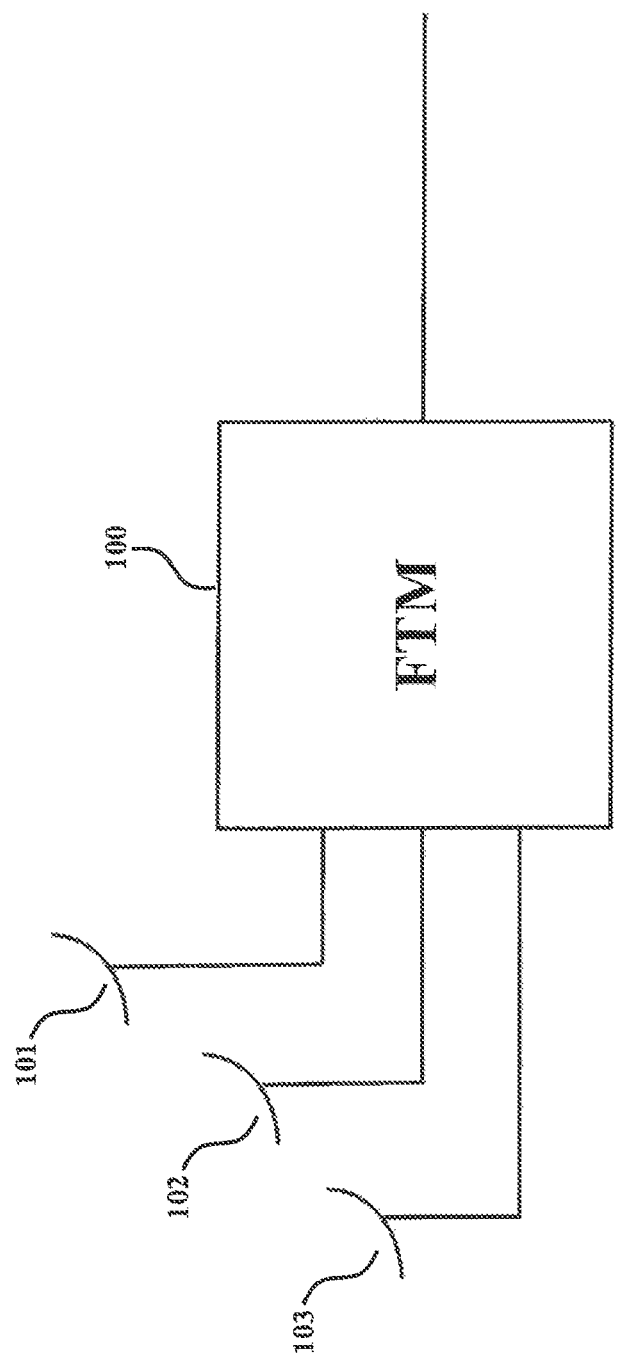
FIG. 1 illustrates a conventional frequency translation module.

FIG. 1 illustrates frequency translation module (FTM) 100 with three signal inputs. In one embodiment, each signal input may be coupled to a satellite antenna 101-103, each receiving a signal from a different orbital location and satellite broadcast. For example, antenna 101 may receive a signal from a satellite source in one orbital location that broadcasts one set of high-definition channels, antenna 102 may receive a signal from a satellite source in another orbital location that broadcasts another set of high-definition channels, and antenna 103 may receive a signal from a satellite source in another orbital location that broadcasts other specialized programming. Alternatively, FTM 100 may receive its inputs from a single antenna with multiple outputs, where each output corresponds to, for example, a different satellite transmission frequency, polarization, or location. Further, each signal input of FTM 100 may also be derived from a cable television (CATV) system or an off-air antenna. However, these mentioned communication broadcast sources are not meant to limit the invention.

Figure 2:
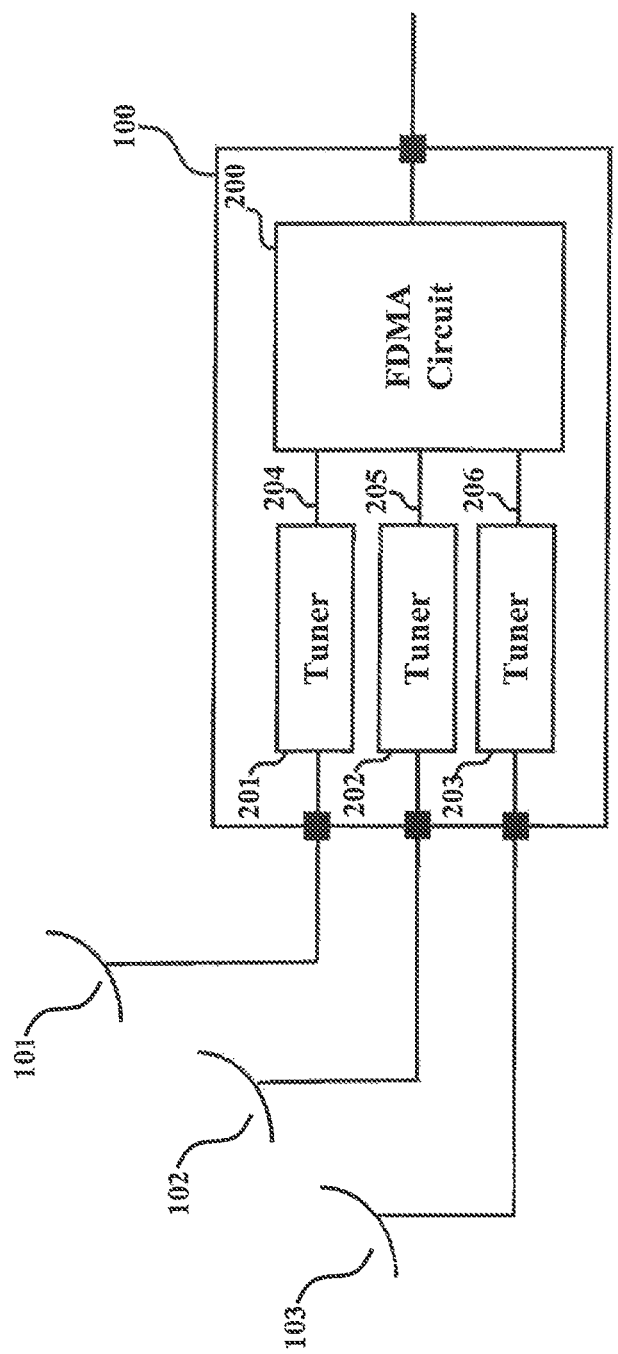
FIG. 2 illustrates a configuration of components in a conventional frequency translation module.

FIG. 2 illustrates a configuration of components in FTM 100. FTM 100 translates each signal input into a channel of interest through a tuner 201-203 and a frequency division multiple access (FDMA) circuit 200. Each tuner 201-203 is coupled to an antenna 101-103. Further, an output of each tuner 201-203 is coupled to FDMA circuit 200. For satellite broadcasts, tuners 201-203 each down-convert a radio frequency (RF) input to a baseband signal. In one embodiment, the RF input signal may be an analog television signal having a plurality of television channels that occupy a particular frequency spectrum. FDMA circuit 200 translates each output from tuners 201-203 into a particular frequency band that can be decoded by an integrated receiver decoder (IRD).

Figure 3:
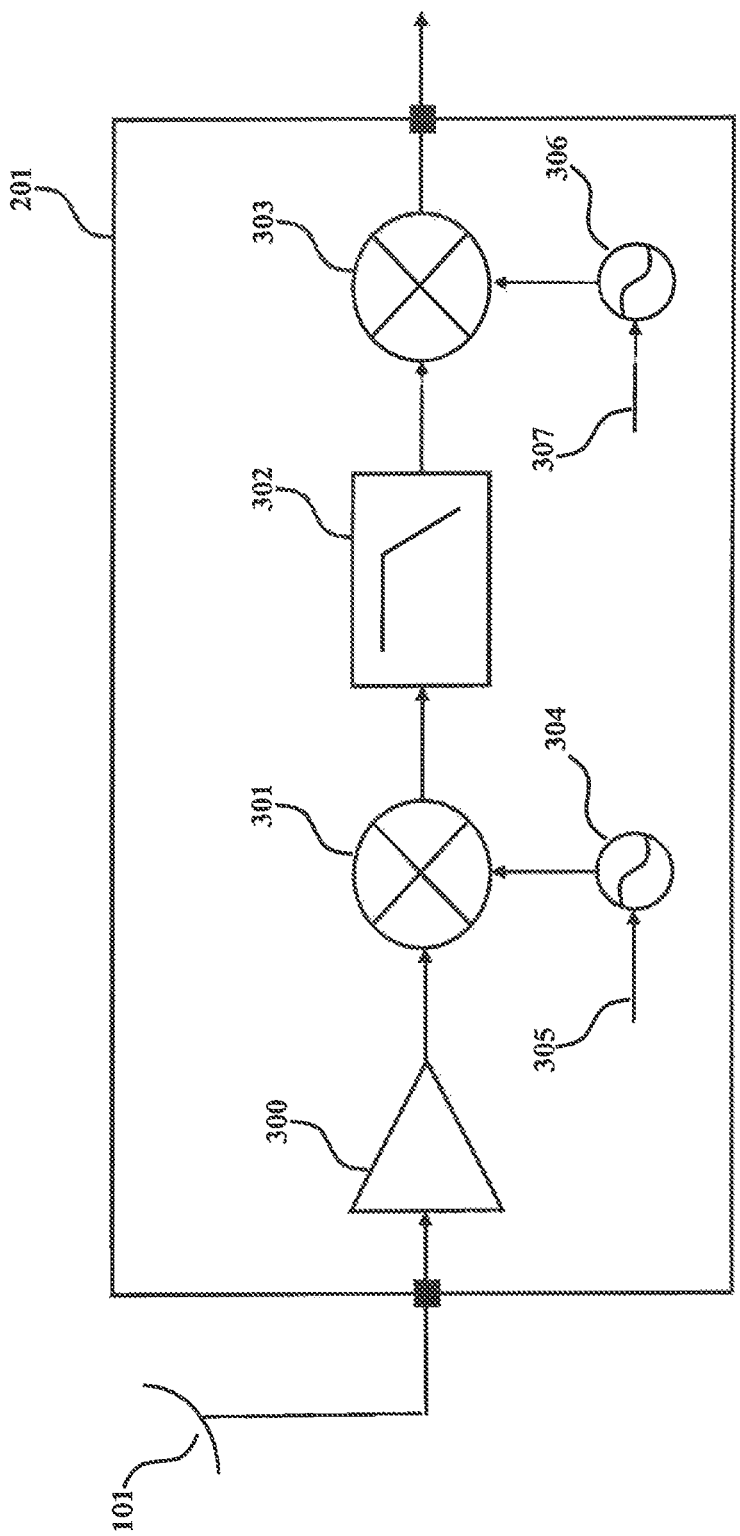
FIG. 3 illustrates a tuner circuit used in a conventional frequency translation module.

As illustrated in FIG. 3, tuner 201 includes an amplifier 300, mixers 301 and 303, a lowpass filter 302, and phase lock loops (PLLs) 304 and 306. Tuner 201 performs a dual frequency conversion to select and down-convert a desired or selected channel from a RF input signal 101. In doing so, amplifier 300 receives and amplifies RF input signal 101, which contains a plurality of television channels. Mixer 301 receives RF input signal 101 from amplifier 300 and also receives a local oscillator (LO) signal from PLL 304. For direct conversion, the frequency of PLL 304 is tuned to the frequency of the desired channel in RF input signal 101 so that it is down-converted to baseband, for further processing. For example, if the desired channel in RF input signal 101 is at 100 MHz, then PLL 304 is tuned to 100 MHz, so that mixer 301 down-converts the desired channel in RF signal 101 to DC.

In television and cable tuners, PLL 304 can be controlled by a control signal 305 so to tune the frequency of the LO signal produced by PLL 304, and thereby control the channel selection that is down-converted to baseband by mixer 301. Control signals for tuner control are well known to those skilled in the relevant art.

Lowpass filter 302 filters the output of mixer 301 to remove unwanted spurious energy that is above baseband. In another embodiment of tuner 201, image rejection techniques may be implemented to reduce undesired signals at the output of mixer 301. For example, a Hartley circuit architecture or Weaver circuit architecture may be incorporated in the design of tuner 201 to further suppress image signals. Image rejection techniques are known to those skilled in the relevant art.

Mixer 303 receives the output of lowpass filter 302 and also receives a LO signal from PLL 306. Mixer 303 up-converts the output of lowpass filter 302 to generate a RF signal containing the channel of interest. Typically, the frequency of PLL 306 is tuned to a frequency within a frequency bandwidth that may be decoded by the IRD. The specific frequencies mentioned in the description of tuner 201, and throughout this application, are given for example purposes only and are not meant to be limiting. Those skilled in the relevant art will recognize other frequency applications for tuner 201 based on the discussion given herein. These other frequency applications are within the scope and spirit of the present invention.

Figure 4:
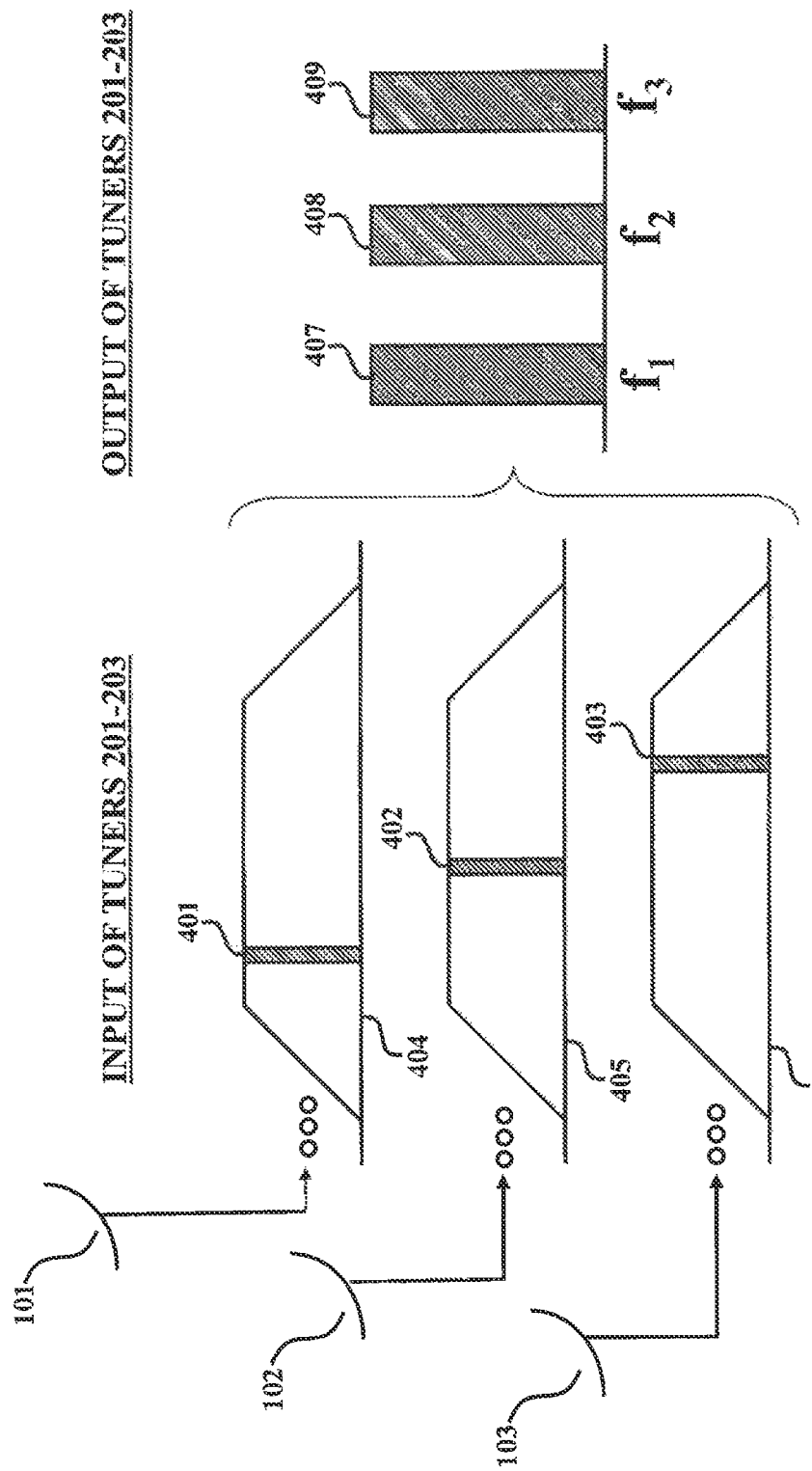
FIG. 4 illustrates a processing of signals through a tuner and frequency division multiple access circuit in a conventional frequency translation module.

In returning to FIG. 2, antennas 101-103 may receive signals in different frequency spectrums (e.g., antenna 101 may receive high-definition signals in one frequency spectrum, tuner 102 may receive specialized programming in another frequency spectrum, and so forth). Exemplary frequency spectrums 404-406 are illustrated in FIG. 4, where each frequency spectrum 404-406 contains a channel of interest (e.g., channels 401, 402, and 403). Tuners 201-203 process channels 401-403 to generate outputs 407-409 within the same frequency spectrum using the frequency conversion process described above with respect to FIG. 3.

FDMA circuit 200 receives each output 407-409 and further processes each signal into a composite signal within a given frequency bandwidth that can be decoded by the IRD. The IRD decodes these signals and separates them into viewer channels, which are then passed to a television or computer monitor for viewing by a user. FDMA circuits and IRDs are known to those skilled in the relevant art.

The FTM architecture described above may be adequate for applications with a small number of FTM input sources, but the architecture does not scale well when there are many input channel sources. That is, as FTMs grow in capacity, the number of analog components also grows as a result of the number of tuners required for each signal input. For example, for a six-channel FTM, six tuners are required to process each input channel signal; likewise, for a nine-channel FTM, nine tuners are required to process each input channel signal; and, so forth. Many external discrete components may be necessary for signal filtering, which results in an increase in circuit area.

In addition to circuit area, power consumption also increases as a result of growth in FTM capacity. In certain communication system designs, such as mobile or portable applications, circuit area constraints and power consumption requirements may limit the number of channels in a FTM. For example, the analog components in tuner 201 may consume over 1 watt of power. As FTM 100 grows in channel capacity, the number of tuners increases and, consequently, power consumption increases as well. By using digital frequency converters and filters, which are compact in modern integrated circuit technology and consume less power than their analog counterparts, a scalable FTM architecture may be implemented.

Figure 5:
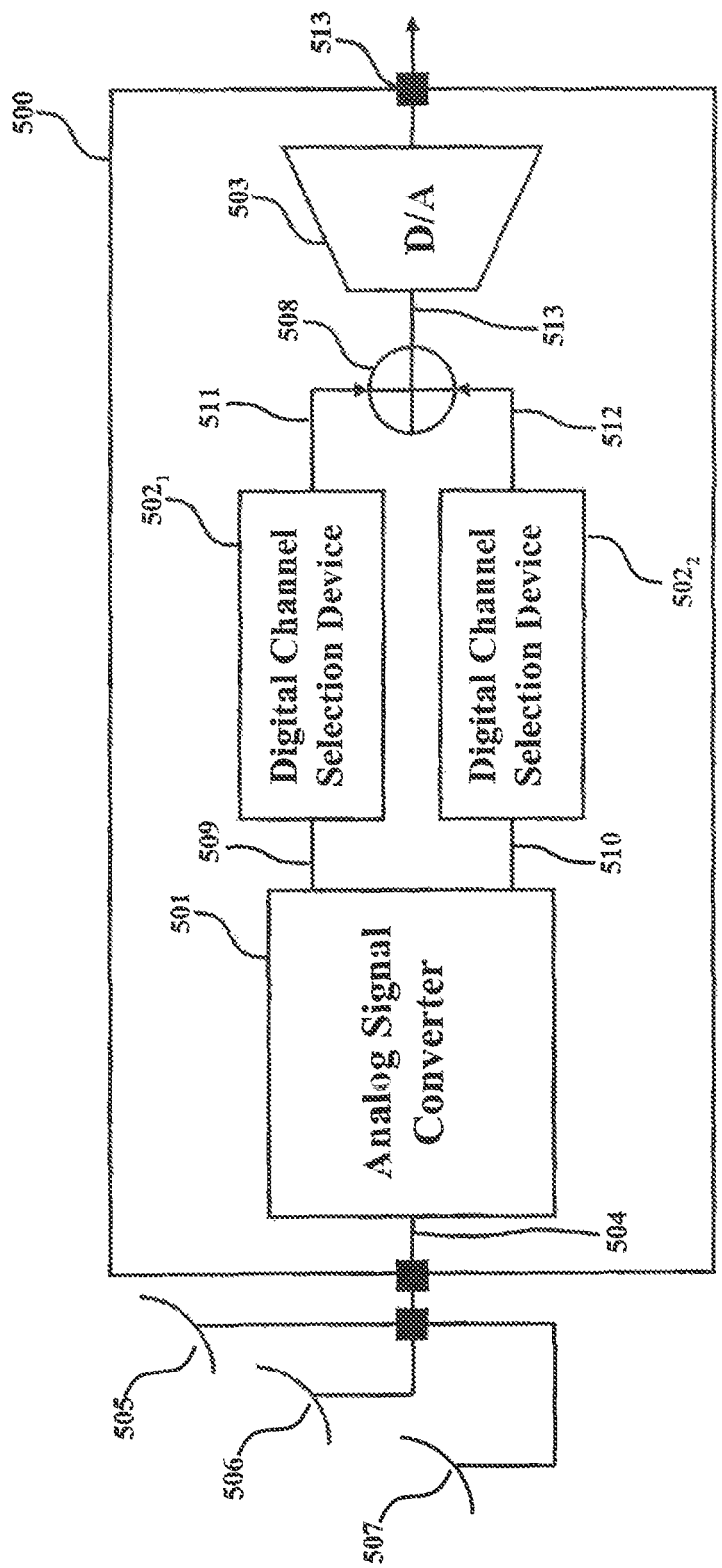
FIG. 5 illustrates one embodiment of a frequency translation module for a broadband multi-channel communication system.

FIG. 5 illustrates a FTM 500 according to one embodiment of the present invention. For explanation purposes, FTM 500 operates in a satellite system that broadcasts signals within two frequency bands (e.g., a lower sideband of 950-1450 MHz and an upper sideband of 1650-2150 MHz). Based on the description herein, a person skilled in the relevant art will recognize that FTM 500 can be designed for a communication system that broadcasts signals in one or more frequency bands.

FTM 500 employs an analog signal converter 501 to convert input signals from analog domain to digital domain. Subsequently, digital channel selection devices $502_1$ and $502_2$ process the digital information through a series of frequency converters and filters to produce a digital stream of data. The digital stream of data contains one or more channels of interest in both a lower and upper frequency band of the satellite system. Finally, a digital summer 508 and a digital-to-analog (D/A) converter 503 transform the digital data to an analog format, such that an IRD can decode the resulting signals and separate them into viewer channels. The channels are then passed to a television or computer monitor for viewing by the user.

Unlike the conventional FTM architecture described above with respect to FTM 100, FTM 500 is a scalable architecture in which analog signal converter 501 can be used for two or more input channel sources (e.g., antennas 505-507) without growth in size or complexity. For instance, as noted above with respect to FTM 100, a six-channel FTM would require six tuners and, accordingly, a nine-channel FTM would require nine tuners. Both the number of analog components and power consumption grow proportionately with the number of channels in the conventional design of FTM 100.

On the other hand, the number of analog components and power consumption do not grow proportionately with an increase in the number of input channel sources in FTM 500. The number of analog components in analog signal converter 501 remains the same regardless of the number of input channel sources received by FTM 500. The number of digital components may grow as a result of the increase in input channel sources. However, the power consumption from the increase in digital components in FTM 500 will typically be far less than the power consumption from an increase in analog components in the conventional design of FTM 100

In referring to FIG. 5, a signal input 504 to FTM 500 may be coupled to one or more broadcast sources. In one embodiment, signal input 504 may be coupled to three satellite antennas 505-507, each receiving a signal from a different orbital location. In another embodiment, signal input 504 may be coupled to a single antenna with multiple outputs, where each output corresponds to, for example, a different transmission frequency, polarization, or location. Further, signal input 504 of FTM 500 may also be coupled to other broadcast sources, such as a CATV system or off-air antennas. However, these communication broadcast sources are not meant to limit the invention.

Figure 6:
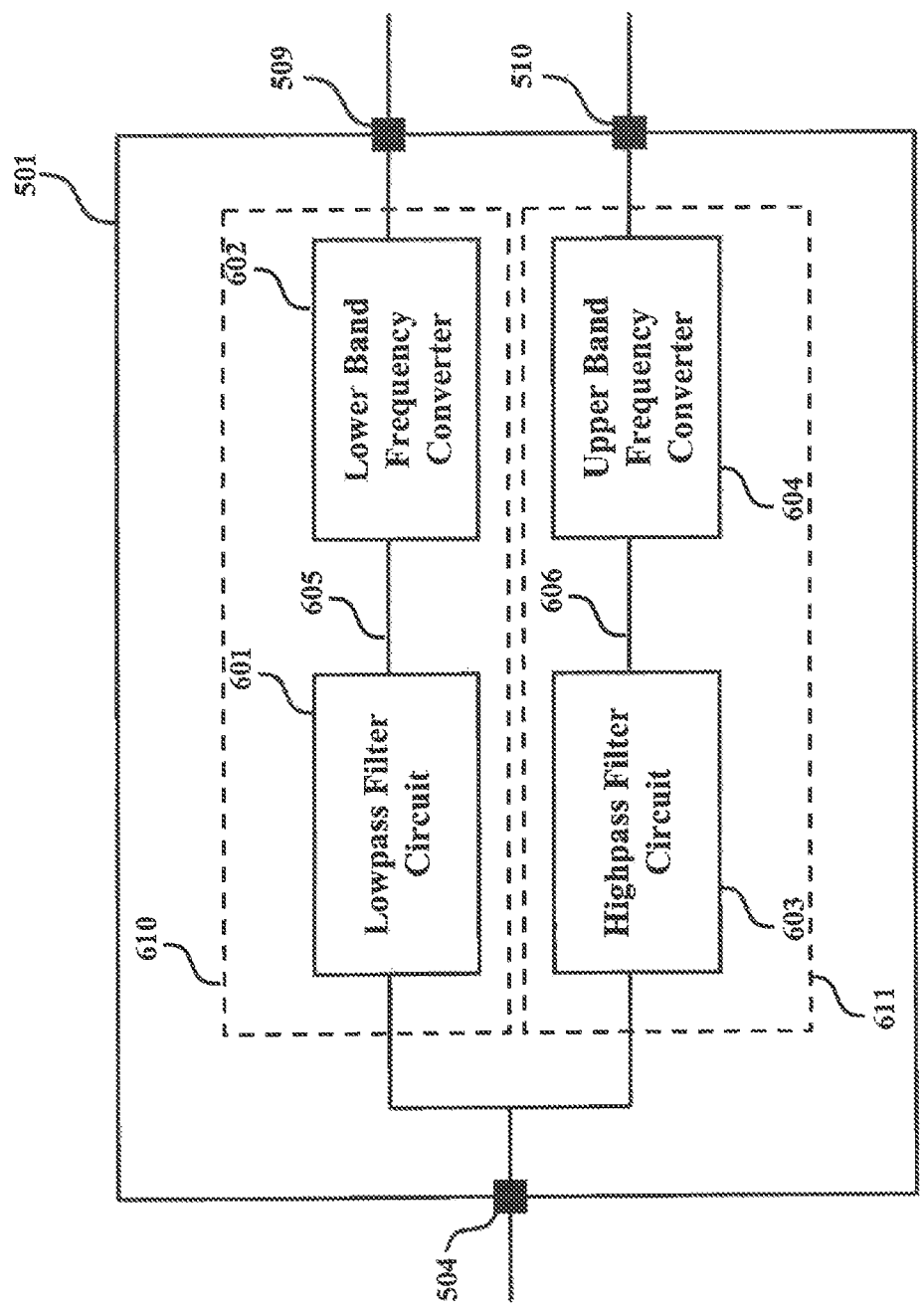
FIG. 6 illustrates one embodiment of an analog signal converter.
Figure 7:
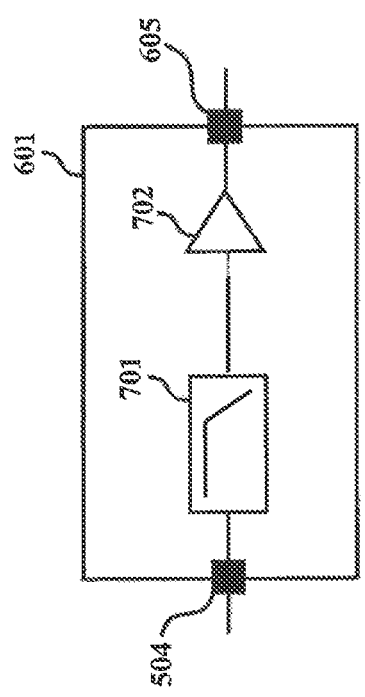
FIG. 7 illustrates one embodiment of a lowpass filter circuit.
Figure 8:
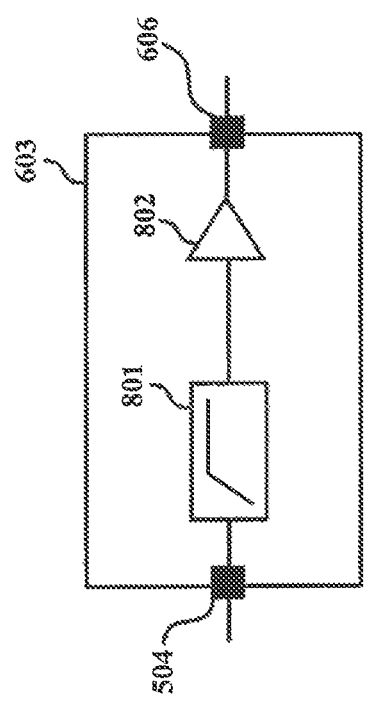
FIG. 8 illustrates one embodiment of a highpass filter circuit.

Analog signal converter 501 translates RF signals from antennas 505-507 into digital format. FIG. 6 illustrates one embodiment of analog signal converter 501, which includes two signal converters 610 and 611. In one embodiment, signal converter 610 includes a lowpass filter circuit 601 and a lower band frequency converter 602. In another embodiment, lowpass filter circuit 601 can be replaced with a bandpass filter configured to filter out frequencies residing in a lower frequency band (e.g., lower sideband 950-1450 MHz). In one embodiment, signal converter 611 includes a highpass filter circuit 603 and an upper band frequency converter 604. In another embodiment, highpass filter circuit 603 can be replaced with a bandpass filter configured to filter out frequencies residing in an upper frequency band (e.g., upper sideband 1650-2150 MHz). FIG. 7 illustrates one embodiment of lowpass filter circuit 601, which includes a lowpass filter 701 and an amplifier 702. Further, FIG. 8 illustrates one embodiment of highpass filter circuit 603, which includes a highpass filter 801 and an amplifier 802.

Figure 9:
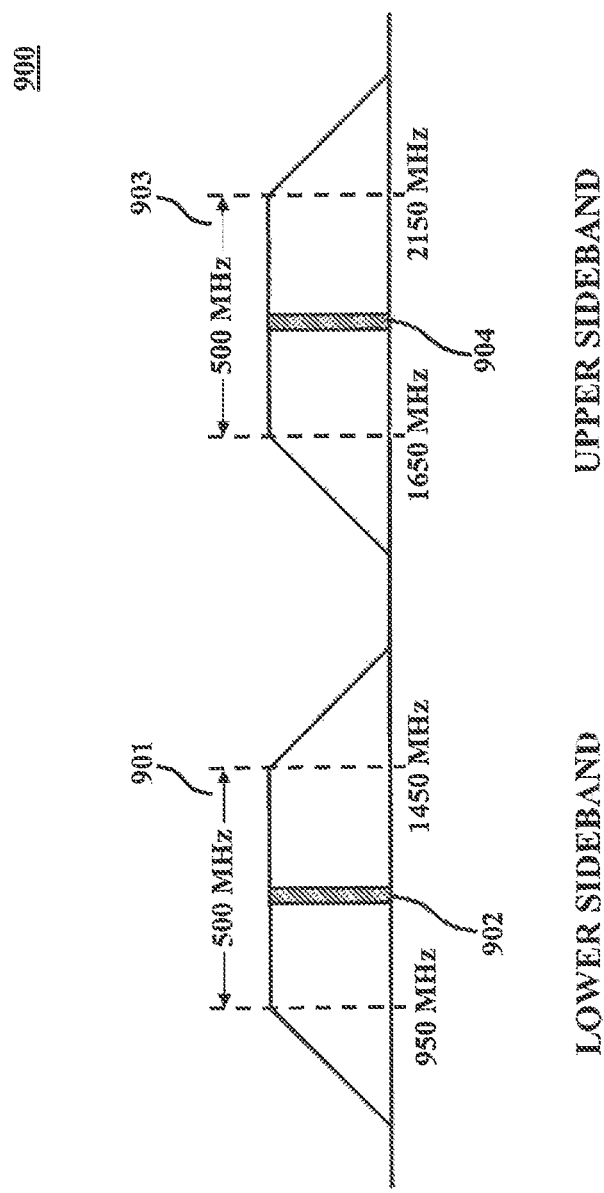
FIG. 9 illustrates a two sideband communication system with a lower sideband and an upper sideband frequency spectrum.

As mentioned above, a communication system with two frequency bands will be discussed to facilitate in the explanation of FTM 500. For example, FIG. 9 illustrates a communication system 900 that broadcasts RF signals in two frequency bands—a lower sideband 901 and an upper sideband 903—that each has a bandwidth of 500 MHz. In this communication system, lowpass and highpass filter circuits 601 and 603 filter one or more FTM input signals into either lower sideband 901 or upper sideband 903 frequency spectrum. For instance, if antennas 505 and 506 receive RF signals between 950 MHz and 1.45 GHz and antenna 507 receives a RF signal between 1.65 GHz and 2.15 GHz, then lowpass filter circuit 601 selectively passes the RF signals from antennas 505 and 506 and suppresses the higher RF signal from antenna 507. Conversely, highpass filter circuit 603 selectively passes the RF signal from antenna 507 and suppresses the lower RF signals from antennas 505 and 506. Amplifier 702 in lowpass filter circuit 601 receives and amplifies the signal from lowpass filter 701. Likewise, amplifier 802 in highpass filter circuit 603 receives and amplifies the signal from highpass filter 801.

The specific frequency bands mentioned in the description of the communication system above, and throughout this application, are given for example purposes only and are not meant to be limiting. Those skilled in the relevant art will recognize that other frequency bands and communication system applications based on the discussion given herein. The other communication systems are within the scope and spirit of the present invention.

Figure 10:
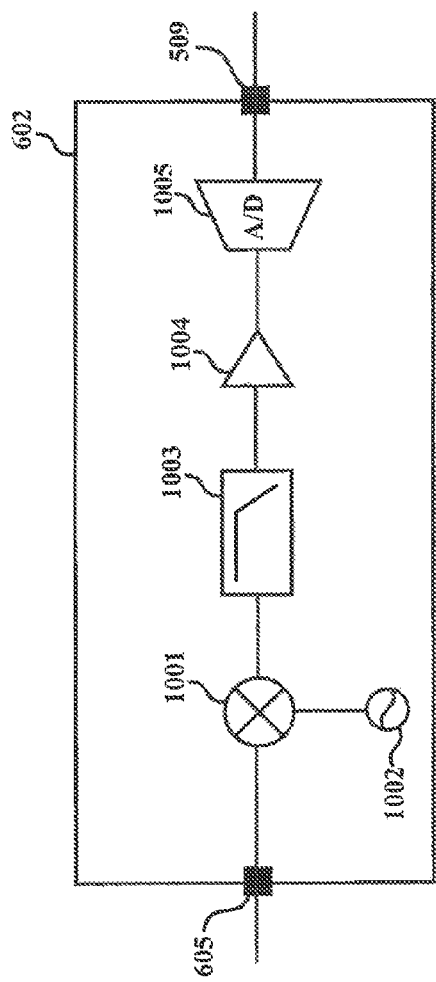
FIG. 10 illustrates one embodiment of a lower band frequency converter.

Lower band frequency converter 602 receives the amplified signal from lowpass filter circuit 601. As illustrated in FIG. 10, lower band frequency converter 602 includes a mixer 1001, a PLL 1002, a lowpass filter 1003, an amplifier 1004, and an analog-to-digital (A/D) converter 1005. Mixer 1001 receives the RF input signal from low pass filter circuit 601 and also receives a LO signal from PLL 1002. In reference to the communication system illustrated in FIG. 9, the frequency of PLL 1002 may be tuned to a frequency 902 substantially in the center of lower sideband 901. For example, if lower sideband 901 has a frequency range between 950 MHz and 1.45 GHz, then PLL 1002 may be tuned to 1.2 GHz.

In tuning PLL 1002 to a frequency 902 substantially in the center of lower sideband 901, one or more RF signals residing in lower sideband 601 may be down-converted to an alternate frequency. For example, in reference to FIG. 5, FTM 500 may be coupled to three satellite antennas 505-507 broadcasting television channels in a frequency range residing in lower sideband 901. After the RF signals received from each satellite antenna 505-507 are filtered by lowpass filter circuit 601, mixer 1001 down-converts these signals to another frequency.

Lowpass filter 1003 filters the output of mixer 1001 to remove unwanted spurious energy that is above baseband. Similar to the description with respect to FIG. 3, in another embodiment of lower band frequency converter 602, image rejection techniques may be implemented to reduce undesired signals at the output of mixer 1001. For example, a Hartley circuit architecture or Weaver circuit architecture may be implemented to further suppress image rejection. Image rejection techniques are known to those skilled in the relevant art In FIG. 10, amplifier 1004 receives the output of lowpass filter 1003 and amplifies the RF signal. A/D converter 1005 samples the RF signal to translate the analog signal into a digital format. The digital data is then processed by digital channel selection device 502 to filter unwanted noise and to increase the resolution of the digital signal. An example of A/D converter 1005 is a sigma-delta A/D converter and flash A/D converter. Alternatively, other types of A/D converters may be used.

Figure 11:
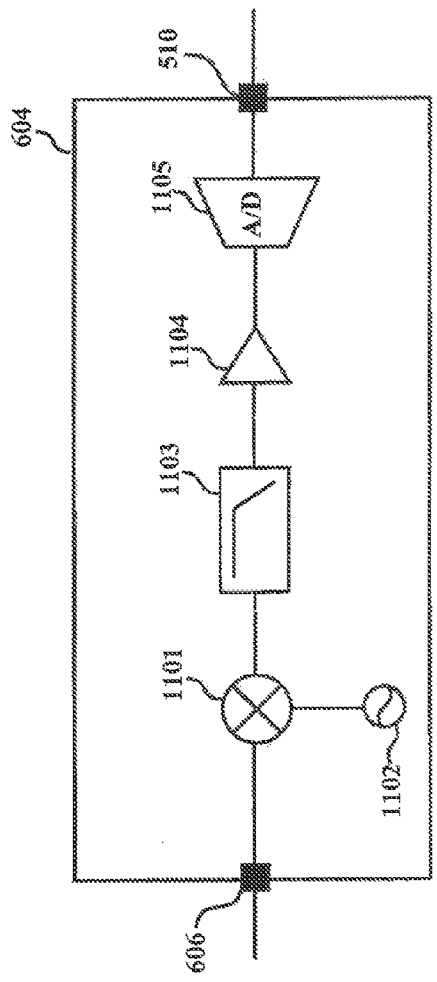
FIG. 11 illustrates one embodiment of an upper band frequency converter.

FIG. 11 illustrates an embodiment of upper band frequency converter 604, which includes a mixer 1101, a PLL 1102, a lowpass filter 1103, an amplifier 1104, and an A/D converter 1105. Mixer 1101 receives the RF input signal from highpass filter circuit 603 and also receives a LO signal from PLL 1102. In reference to the communication system illustrated in FIG. 9, the frequency of PLL 1102 may be tuned to a frequency 904 substantially in the center of upper sideband 903. For example, if upper sideband 903 has a frequency range between 1.65 GHz and 2.15 GHz, then PLL 1102 may be tuned to 1.9 GHz.

In tuning PLL 1102 to a frequency 904 substantially in the center of upper sideband 903, RF signals residing in upper sideband 903 may be down-converted to an alternate frequency. For example, in reference to FIG. 5, FTM 500 may be coupled to three satellite antennas 505-507 broadcasting television channels in a frequency range residing in upper sideband 903. After RF signals from each satellite antenna 505-507 are filtered by highpass filter circuit 603, mixer 1101 down-converts the signals to another frequency. Lowpass filter 1103, amplifier 1104, and A/D converter 1105 function in a similar manner to that described in FIG. 10.

Figure 12:
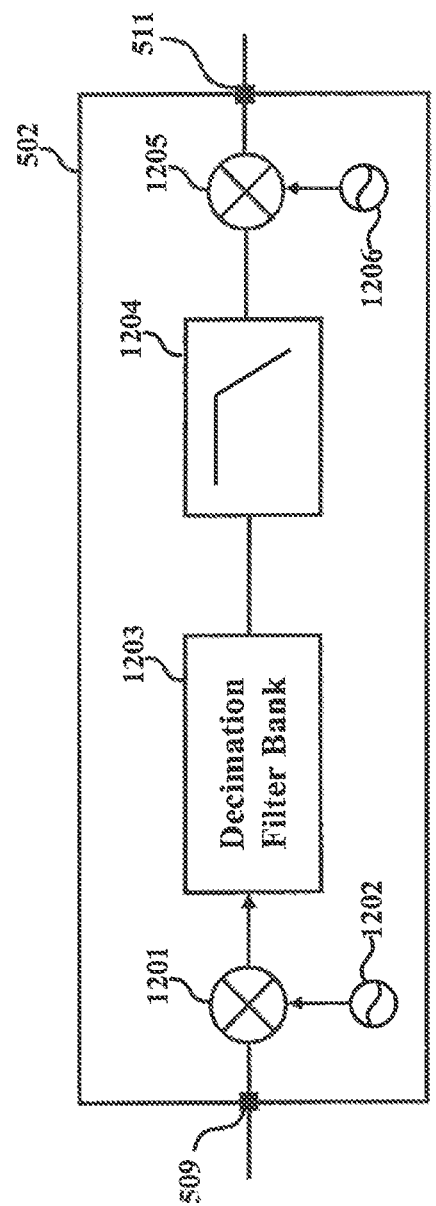
FIG. 12 illustrates one embodiment of a digital channel selection device.

An output of lower band frequency converter 602 is coupled to a digital channel selection device 502$_1$. Likewise, an output of upper band frequency converter 604 is coupled to a digital channel selection device 502$_2$. Digital channel selection devices 502$_1$ and 502$_2$ reduce the sampling rate from the digital outputs of A/D converters 1005 and 1105, filter unwanted noise signals, and increase the resolution of the digital output. As illustrated in FIG. 12, digital channel selection device 502 includes mixers 1201 and 1205, PLLs 1202 and 1206, a decimation filter bank 1203, and a lowpass filter 1204.

Mixer 1201 receives digital data from A/D converters 1005 and 1105 at a particular sampling rate. The frequency of PLL 1202 is tuned to a frequency that reduces the data rate to a more useful value for processing by decimation filter bank 1203. An example of PLL 1202 is a direct digital frequency synthesis (DDFS) device. A DDFS device may be a phase accumulator that generates a digitized waveform. DDFS devices are known to those skilled in the relevant art. Alternatively, other types of PLLs may be used.

Decimation filter bank 1203 receives the output of mixer 1201. Decimation filter bank 1203 is designed to down-sample, or decimate, the output of mixer 1201 and to filter the digital signal such that a proper frequency response and signal-to-noise ratio are achieved. For example, in referring to the communication system illustrated in FIG. 9, antenna 505 may receive a RF signal with a frequency of 1.3 GHz, which resides in lower sideband 901. Lowpass filter circuit 601 selectively passes the 1.3 GHz signal to lower band frequency converter 602. As described with respect to FIG. 10, PLL 1002 may be tuned to a frequency 902 substantially in the center of lower sideband 901. In FIG. 9, this center frequency is approximately 1.1 GHz. The output of mixer 1001 contains the sum and difference of its two frequency inputs (i.e., input frequencies, 1.3 and 1.1 GHz), to produce an output signal with frequencies of 0.2 GHz and 2.4 GHz. Lowpass filter 1003 filters-out the frequency summation output of mixer 1001 (i.e., 1.3 GHz+1.1 GHz=2.4 GHz), leaving a signal with a frequency of the difference of the two input frequencies (i.e., 1.3 GHz−1.1 GHz=0.2 GHz) at the output of lowpass filter 1003. The intermediate frequency output of lowpass filter 1003 is then processed into a digital signal through amplifier 1004 and A/D converter 1005. The frequency of the digital signal at the output of A/D converter 1005 is then converted to another intermediate frequency. Highpass filter circuit 603 and upper band frequency converter 604 process RF signals that reside in upper sideband 903 in a similar manner to that described above.

Decimation filter bank 1203 receives the output of mixer 1201 and processes the digital data into a narrow band of output frequencies. This narrow band of frequencies contains the channels of interest. Decimation filters are known to those skilled in the relevant art.

Lowpass filter 1204 filters the output of decimation filter bank 1203 to remove unwanted spurious energy that is above baseband. Further, mixer 1205 receives the output of lowpass filter 1204 and also receives a LO signal from PLL 1206. Mixer 1205 up-converts the frequency of the digital signal output of lowpass filter 1204 to an alternate frequency. The up-converted frequency may be in a frequency bandwidth that may be decoded by the IRD. PLL 1206 functions in a similar manner to that described with respect to PLL 1202. A person skilled in the relevant art will appreciate that for a given set of frequencies within lower sideband 901, lower band frequency converter 602 may output a narrow L and of frequencies containing a channel of interest from this band of frequencies; likewise, upper band frequency converter 604 may also output a narrow band of frequencies containing a channel of interest from frequencies in upper sideband 903.

In returning to FIG. 5, digital summer 508 sums the outputs of digital channel selection devices 502$_1$ and 502$_2$. Digital summer 508 produces a composite digital representation of a reduced bandwidth signal containing channels of interest from among a full spectrum of RF signals received by antennas 505-507. D/A converter 503 receives the output from digital summer 508 and translates the digital output into an analog signal that may be decoded by an IRD. The IRD decodes the RF signals and separates them into viewer channels, which are then passed to a television or computer monitor for viewing by a user. Digital summer devices and D/A converters are known to those skilled in the relevant art.

In view of the discussion above with respect to FIGS. 5-12, as the number of input channel sources received by FTM 500 increase, the architecture of FTM 500 not only occupies a smaller circuit footprint than conventional FTM 100, but also consumes less power than FTM 100. Specifically, as the number of input channel sources grows, analog converter 501 in FTM 500 does not increase in size or complexity, whereas FTM 100 would require an additional tuner for each additional input channel source. Even though the number of digital circuits may grow in FTM 500 as a result of an increase in input channel sources, integrated digital circuits typically consume tar less circuit area than analog components in tuner designs. Further, since FTM 100 would require an additional tuner for each additional input channel source, each additional tuner in FTM 100 would typically consume far more power than digital circuits used in the signal processing in FTM 500.

Figure 13:
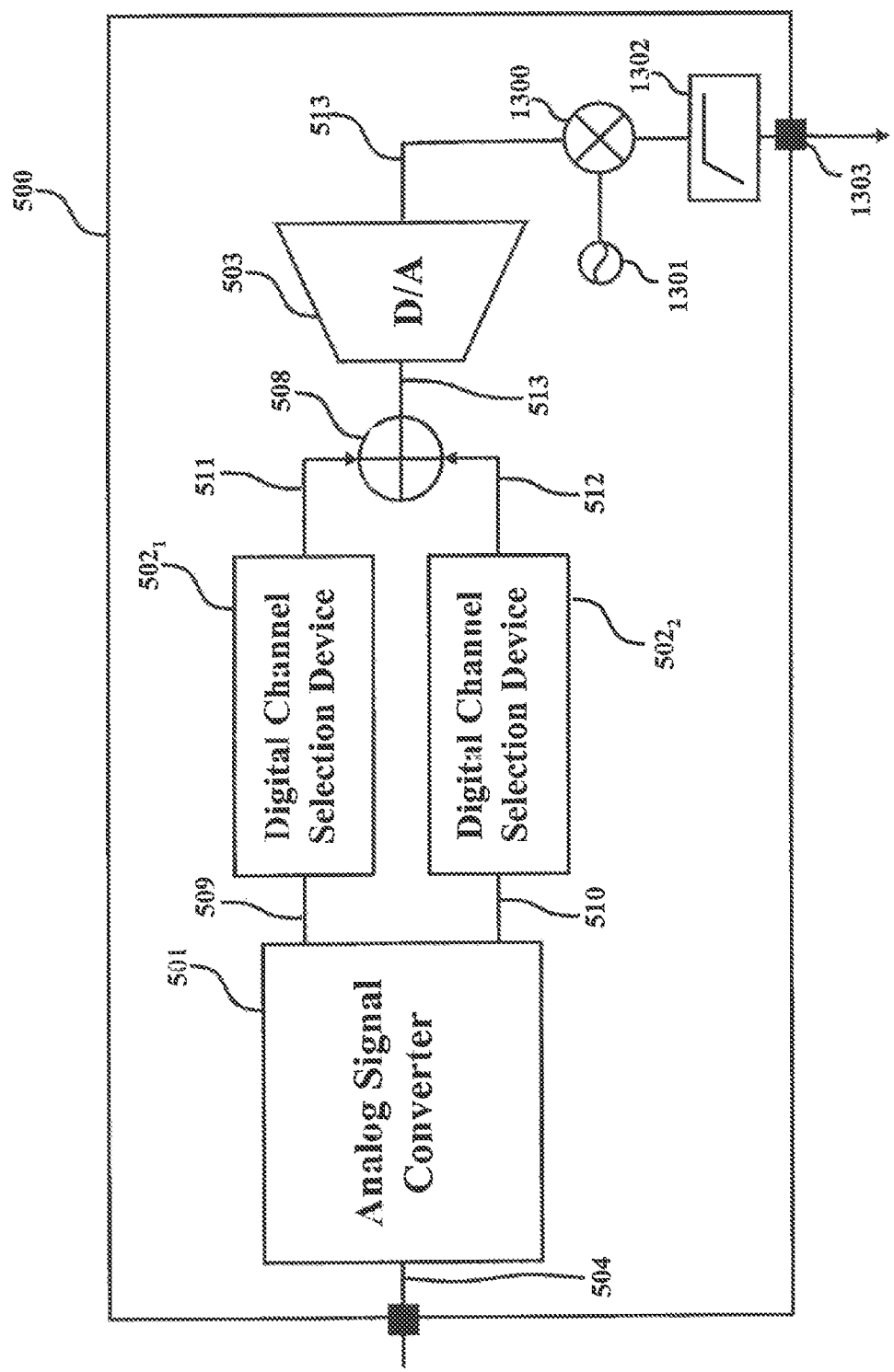
FIG. 13 illustrates another embodiment of a frequency translation module for a broadband multi-channel communication system.

FIG. 13 illustrates another embodiment of FTM 500, where a mixer 1300, a PLL 1301, and a lowpass filter 1302 are coupled to an output 513 of D/A converter 503. Mixer 1300 may be used to up-convert the output of D/A converter 508 to a RF signal containing the channel of interest. The frequency of PLL 1301 may be tuned to a frequency within a frequency bandwidth that may be decoded by an IRD. Highpass filter 1302 filters the output of mixer 1300 to remove unwanted spurious energy that is above baseband. The IRD decodes the signals at an output 1303 of highpass filter 1302 and separates them into viewer channels, which are then passed to a television or computer monitor for viewing by a user. IRDs are known to those skilled in the relevant art.

Figure 14:
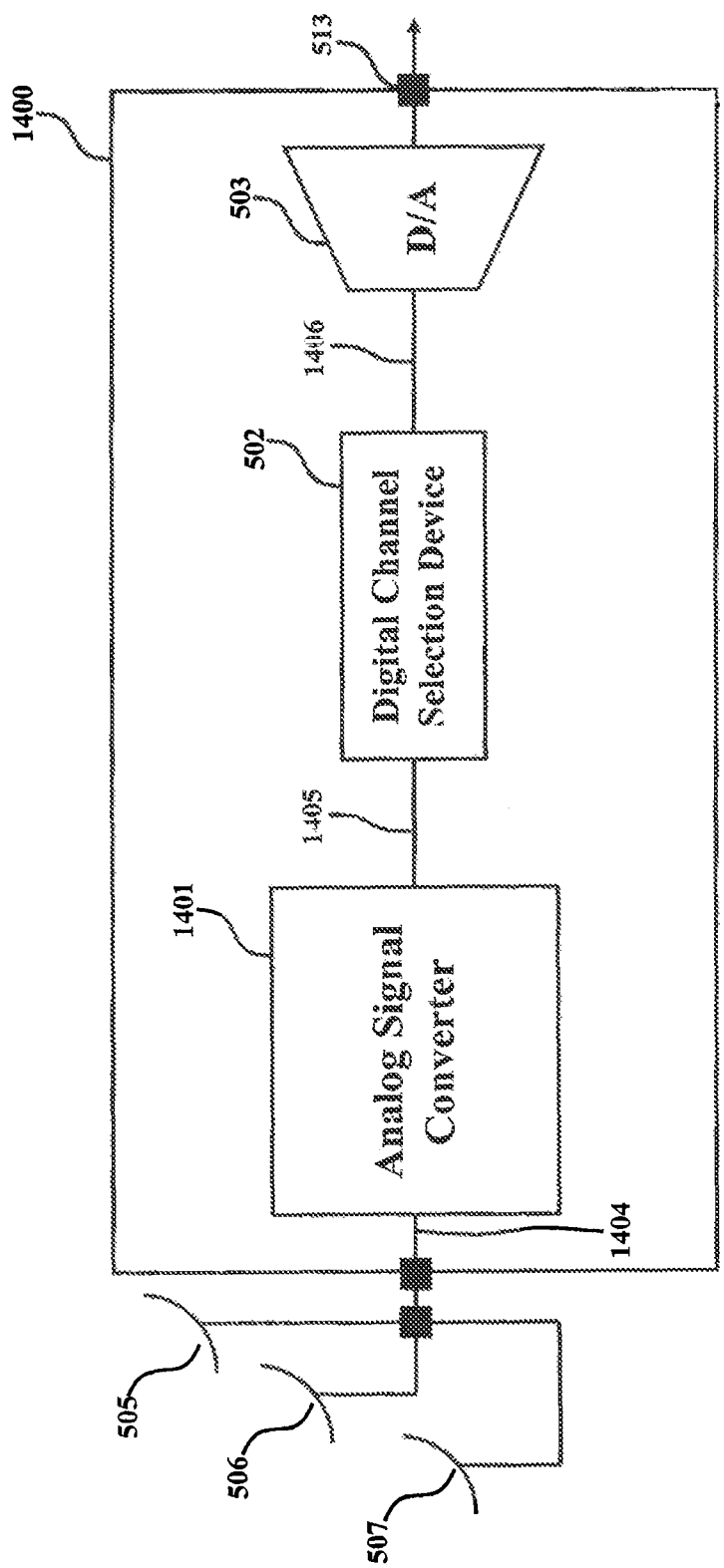
FIG. 14 illustrates another embodiment of a frequency translation module for a broadband multi-channel communication system.

FIG. 14 illustrates a FTM 1400 according to an embodiment of the present invention. FTM 1400 includes an analog signal converter 1401, digital channel selection device 502, and D/A converter 503. Digital channel selection device 502 and D/A converter 503 function in the same manner as described above with respect to FIG. 5.

Figure 15:
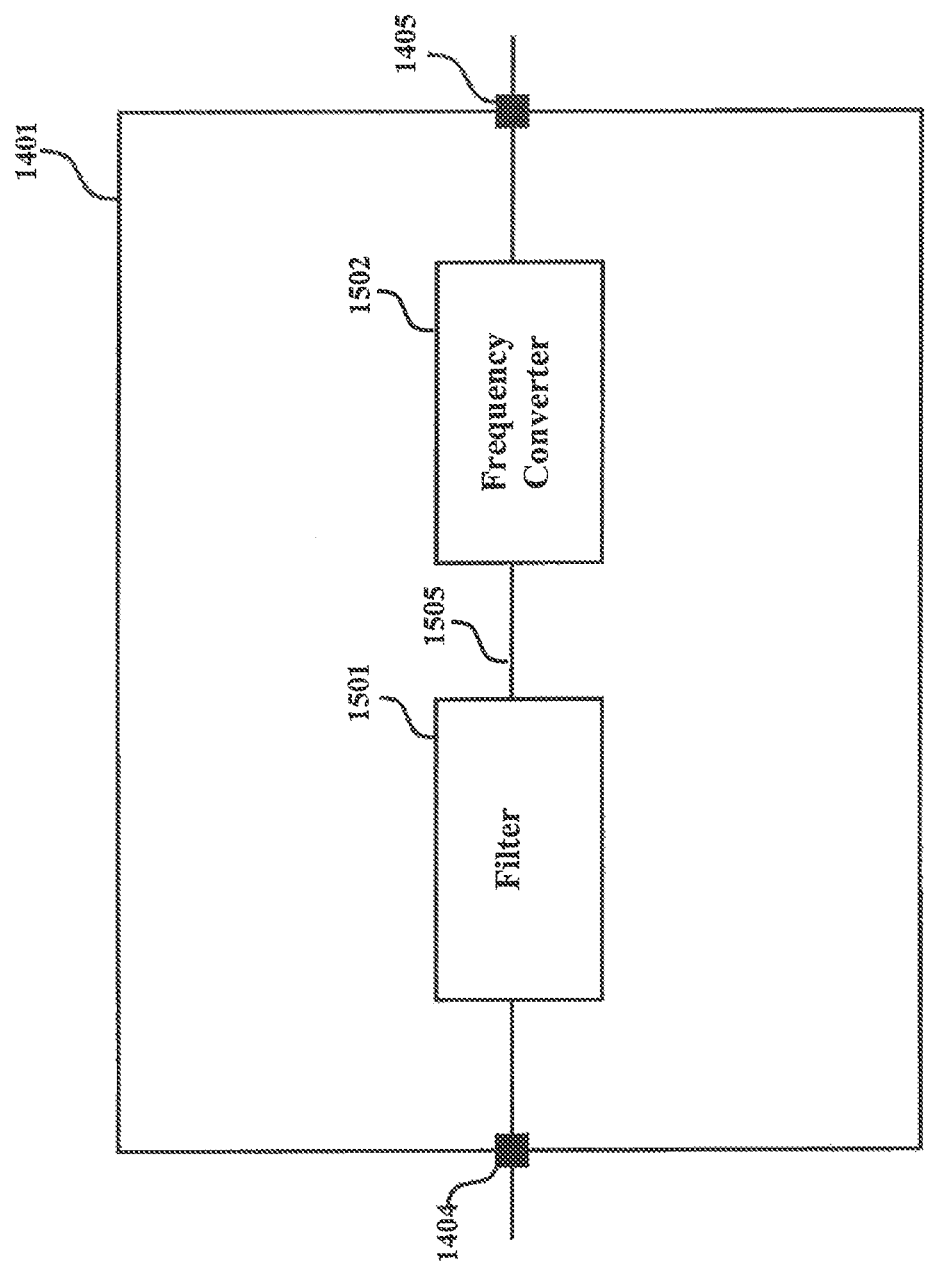
FIG. 15 illustrates another embodiment of an analog signal converter.

FIG. 15 illustrates an embodiment of analog signal converter 1401. Analog signal converter 1401 includes a filter 1501 and a frequency converter 1502. Analog signal converter 1401 functions in a similar manner as signal converters 610 and 611 described above with respect to FIG. 6. However, unlike the processing of signals residing in the lower and upper frequency bands by signal converters 610 and 611, respectively, analog signal converter 1401 processes signals residing in both the lower and upper frequency bands (e.g., a frequency spectrum compatible with a broadband communication system in which FTM 1400 is implemented). A person skilled in the relevant art will recognize, based on the description herein, that analog signal converter 1401 can process signals in communication systems with broadcasts in one or more frequency bands.

Filter 1501 selectively passes RF signals from antennas 505-507 to frequency converter 1502. In one embodiment, filter 1501 may be a bandpass filter configured to filter out signals residing in a predefined frequency band such as, for example, 950-2150 MHz. In an embodiment, the predefined frequency band can be an entire frequency spectrum compatible with a broadband communication system in which FTM 1400 is implemented or a sub-set of the frequency spectrum. Similar to amplifiers 702 and 802 in FIGS. 7 and 8, respectively, an output signal of the bandpass filter may be amplified before being passed to frequency converter 1502 according to an embodiment of the present invention. In another embodiment, filter 1501 can be a lowpass or a highpass filter.

Frequency converter 1502 functions in a similar manner as lower band frequency converter 602 and upper band frequency converter 604 in FIGS. 10 and 11, respectively. In particular, frequency converter 1502 receives a filtered signal from filter 1501, processes the filtered signal through a mixer, filters the signal from an output of the mixer to remove unwanted spurious energy above baseband, amplifies the resulting filtered signal, and samples the amplified signal to translate the analog signal into a digital format. The mixer in frequency converter 1502 receives a LO signal from a PLL, where in one embodiment, the frequency of the PLL may be tuned to a frequency substantially in the center of a predefined frequency band. For instance, if FTM 1400 operates in a satellite system that broadcasts signals between 950-2150 MHz, then the PLL may be tuned to 1.55 GHz.

Further, in an embodiment of FTM 1400, a mixer, a PLL, and a lowpass filter can be coupled to an output of D/A converter 503. The configuration and operation of the mixer, PLL, and lowpass filter are similar to that of mixer 1300, PLL 1301, and lowpass filter 1302 of FIG. 13.

Figure 16:
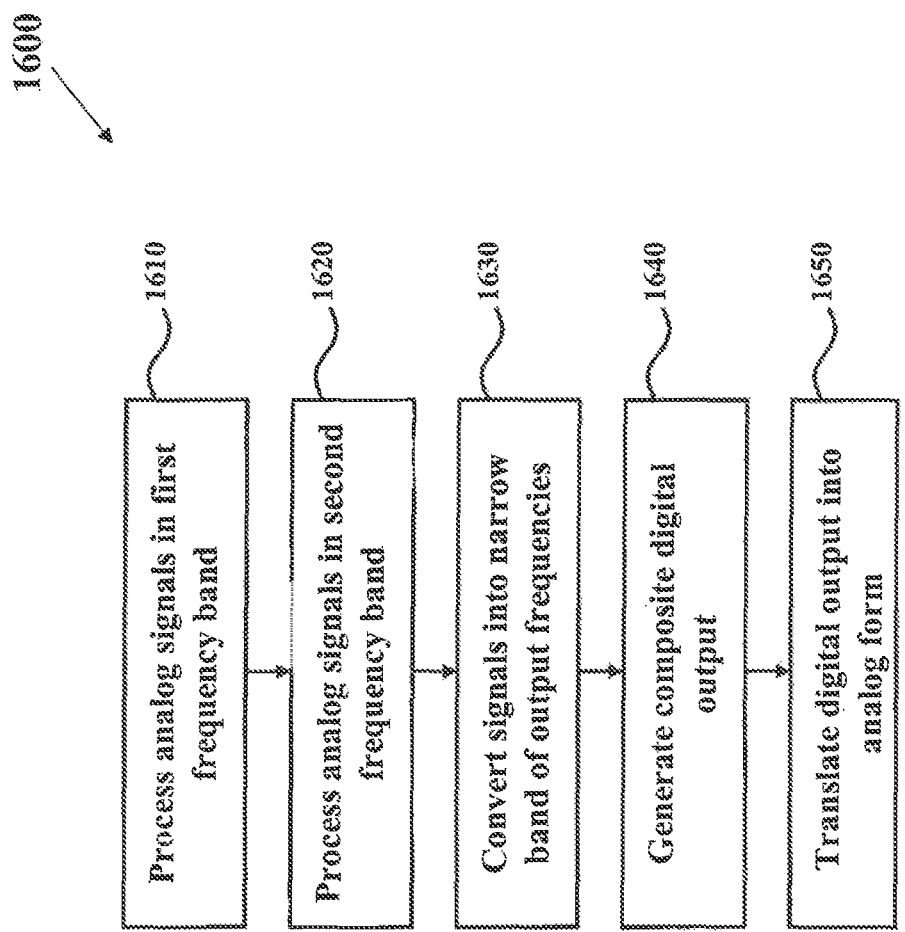
FIG. 16 illustrates one embodiment of a method of switching channels on a broadband multi-channel communication system with a scalable switch architecture.

FIG. 16 illustrates one embodiment of a method 1600 to switch channels on a broadband multi-channel communication system with a scalable switch architecture. Method 1600 may occur using, for example, FTM 500. In step 1610, an analog signal whose frequency resides in a first frequency band of the communication system is processed. In step 1620, an analog signal whose frequency resides in a second frequency band of the communication system is processed. The first frequency band may correlate to a lower sideband frequency spectrum and the second frequency band may correlate to an upper sideband frequency spectrum in a two frequency sideband communication system. An example of a communication system with two frequency sidebands is illustrated in FIG. 9.

In returning to FIG. 16, step 1630 converts the processed analog signals, from the first and second frequency bands, into a narrow band of digital output frequencies. For example, digital channel selection device 502 may be used to perform step 1630. In turning to step 1640, a composite digital output from the narrow band of digital output frequencies is generated. Digital summer 508 in FIG. 5 may be used to perform this step. In step 1650, the digital signals resulting from step 1640 are translated into analog form such that a receiver may decode the signals. D/A converter 503 in FIG. 5 may be used to perform step 1650.

Figure 17:
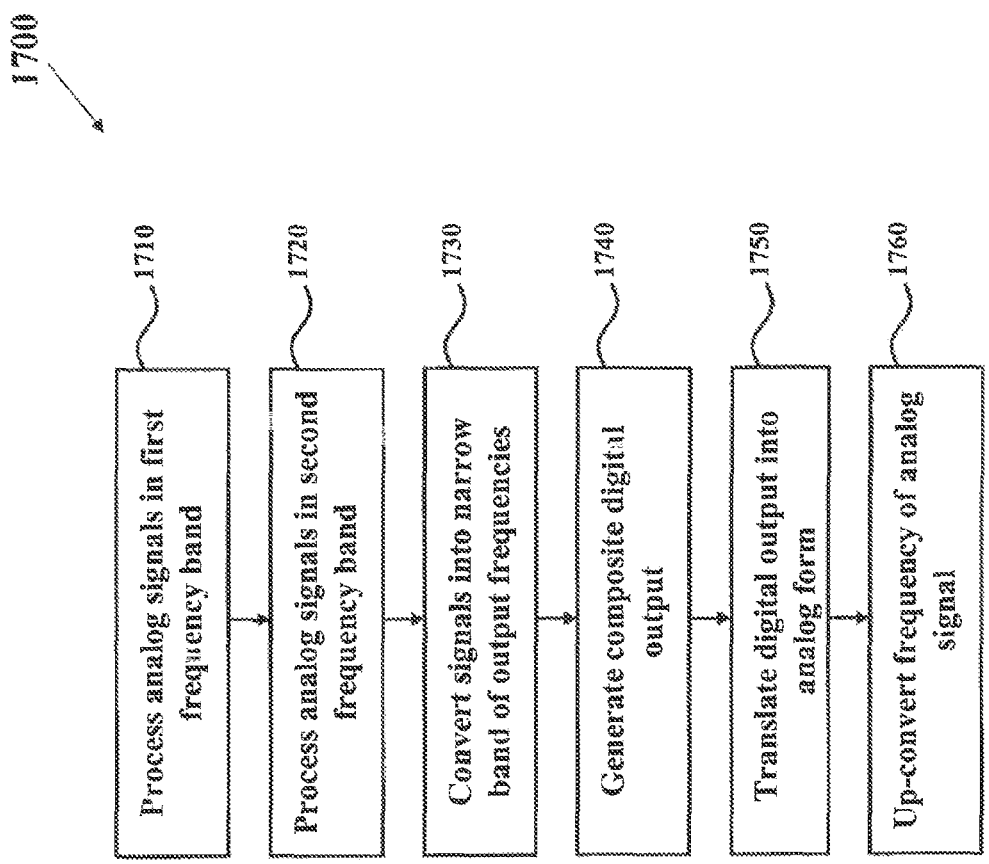
FIG. 17 illustrates another embodiment of a method of switching channels on a broadband multi-channel communication system with a scalable switch architecture.

FIG. 17 illustrates another embodiment of a method 1700 to switch channels on a broadband multi-channel communication system with a scalable switch architecture. Steps 1710-1740 perform in a similar manner to steps 1610-1640 in FIG. 16. Step 1750 translates the digital signals resulting from step 1740 into analog form. In step 1760, the resulting analog signals from step 1750 are up-converted to a frequency within a frequency bandwidth that may be decoded by a receiver. Mixer 1300, PLL 1301, and highpass filter 1302 in FIG. 13 may be used to up-convert the frequency of the analog signal such that a receiver may decode the analog signal.

Figure 18:
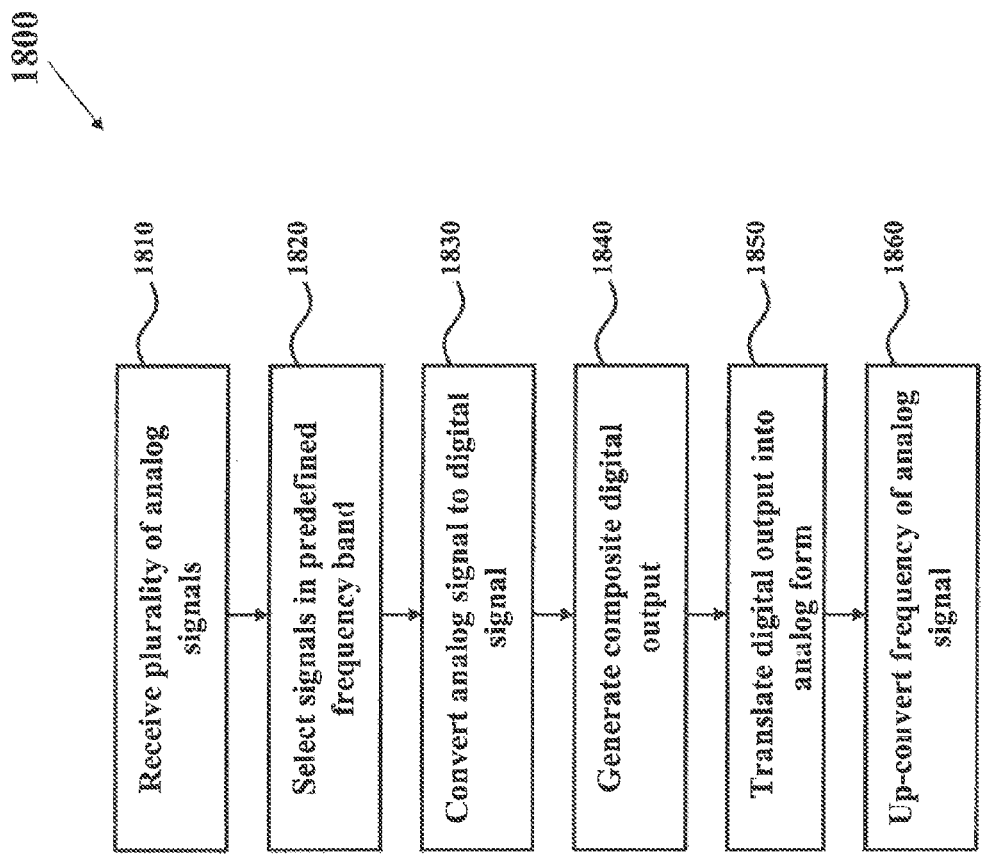
FIG. 18 illustrates yet another embodiment of a method of switching channels on a broadband multi-channel communication system with a scalable switch architecture.

FIG. 18 illustrates yet another embodiment of a method 1800 to switch channels of a broadband multi-channel communication system with a scalable switch architecture. In step 1810, a plurality of analog signals is received by a frequency translation module. FTM 1400 can be used, for example, to receive the plurality of analog signals, where the plurality of analog signals can be received from different satellite orbital locations, polarizations, and satellite transmission frequencies. In an embodiment, the plurality of analog signals reside in a frequency spectrum compatible with the broadband multi-channel communication system (e.g., 950-2150 MHz).

In step 1820, analog signals whose frequencies reside in a predefined frequency band of the communication system are selected. In an embodiment, the analog signals can be selected using a bandpass filter. In another embodiment, the analog signal can be selected using a lowpass filter. The analog signal can also be selected using a highpass filter according to yet another embodiment of the present invention.

In step 1830, each of the selected analog signals from step 820 are converted into a digital signal. A/D converter 1005 or A/D converter 1105 of FIGS. 10 and 11, respectively, can be used, for example, to convert the selected analog signals into a digital format.

In step 1840, a composite digital output is generated from the converted digital signals in step 830. For example, digital channel selection device 502 may be used to perform step 1840.

Step 1850 translates the composite digital output into an analog signal output decodable by a receiver. Further, step 1860 upconverts the analog signal output to a frequency decodable by the receiver.

Figure 19:
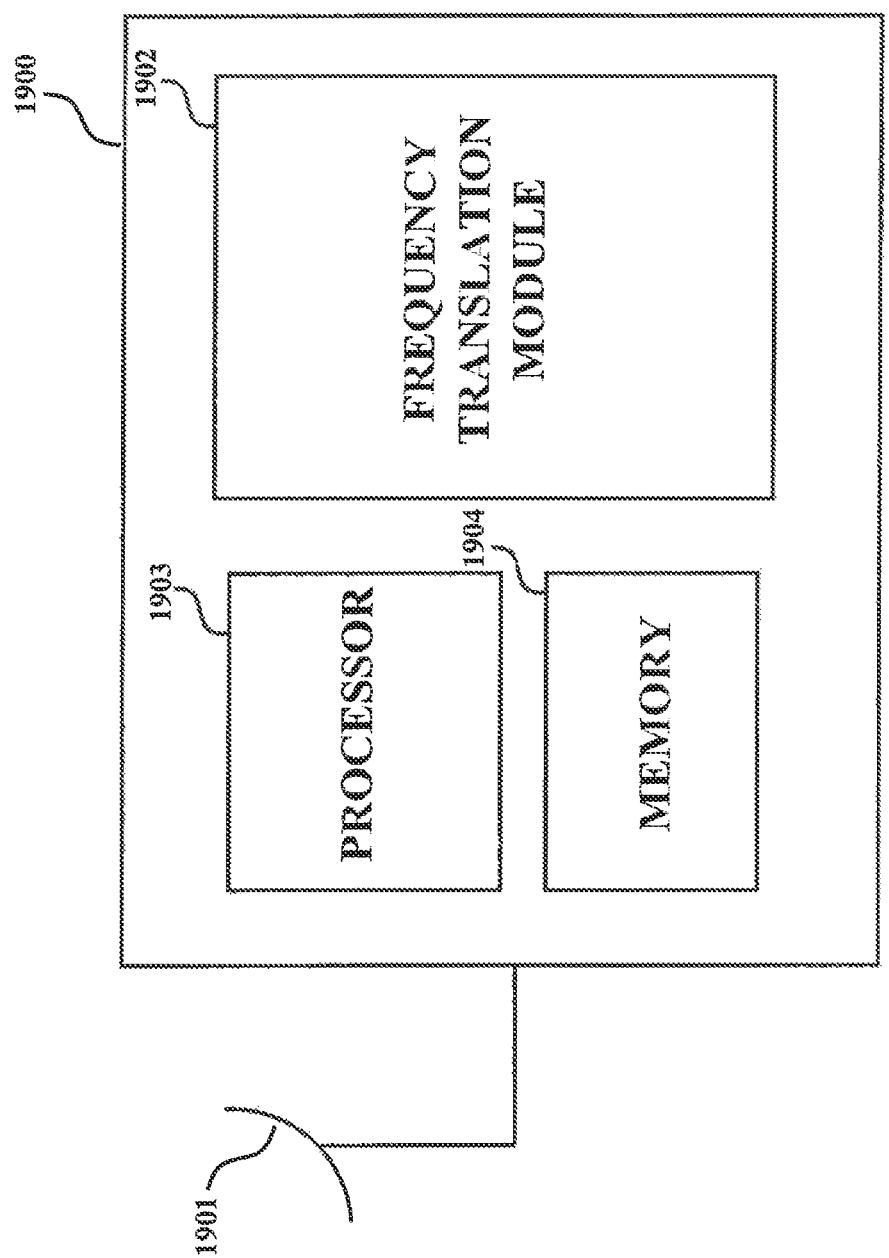
FIG. 19 illustrates one embodiment of a system for switching channels on a broadband multi-channel communication system with a scalable switch architecture.

FIG. 19 illustrates one embodiment of a system 1900 for switching channels on a broadband multi-channel communication system with a sealable switch architecture. System 1900 includes an antenna 1901, a FTM 1902, a processor 1903, and a memory 1904. The representative signal processing functions described herein can be implemented in hardware, software, or some combination thereof. For instance, the signal processing functions can be implemented using computer processors, computer logic, application specific circuits (ASICs), digital signal processors, etc., as will be understood by those skilled in the arts based on the discussion given herein. Accordingly, any processor that performs the signal processing functions described herein is within the scope and spirit of the present invention.

Further, the signal processing functions described herein could be embodied by computer program instructions that are executed by a computer processor or any one of the hardware devices listed above. The computer program instructions cause the processor to perform the signal processing functions described herein. The computer program instructions (e.g., software) can be stored in a computer usable medium, computer program medium, or any storage medium that can be accessed by a computer or processor. Such media include a memory device such as a RAM or ROM, or other type of computer storage medium such as a computer disk or CD ROM, or the equivalent. Accordingly, any computer storage medium having computer program code that cause a processor to perform the signal processing functions described herein are within the scope and spirit of the present invention.

In reference to FIG. 19, FTM 1902 is coupled to antenna 1901 and receives signals through antenna 1901. Processor 1903 is coupled to FTM 1902 and controls the operation of FTM 1902. Memory 1904 is in communication with processor 1903 and stores processing instructions. In one embodiment of the present invention, these processing instructions direct processor 1903 to perform the procedures of method 1800. Specifically, the processing instructions direct processor 1903 to perform the following: (1) receive a plurality of analog signals; (2) filter out analog signals whose frequency resides in a predefined frequency band of the communication system; (3) convert each of the filtered analog signals into a digital signal; (4) process the digital signal, corresponding to each of the filtered analog signals, into a composite output of digital signals; and, (5) translate the composite output to an analog signal output decodable by a receiver. The processing instructions can also direct processor 1903 to upconvert the analog signal output to a frequency decodable by the receiver.

In one embodiment, the processing direction for directing processor 1903 to convert each of the filtered analog signals may include filtering the analog signal with a filter (e.g., a lowpass filter, highpass filter, and a bandpass filter), mixing the filtered analog signal with a local oscillator (LO) signal with a predefined LO frequency, and digitizing the mixed analog signal with an analog-to-digital (A/D) converter. Further, in one embodiment, the processing direction for directing processor 1903 to mix the filtered analog signal may include mixing the filtered analog signal with a LO signal with a frequency substantially in the center of the predefined frequency band.

In another embodiment of the present invention, the processing instructions stored in memory 1904 direct processor 1903 to perform the procedures of method 1600. In yet another embodiment of the present invention, the processing instructions stored in memory 1904 direct processor 1904 to perform the procedures of method 1700.

In one embodiment, the processing direction for directing the processor to process the analog signal residing in the first frequency band may include tuning a mixer's local oscillator input to a frequency substantially in the center of the first frequency band. Similarly, in one embodiment, the processing direction for directing the processor to process the analog signal residing in the second frequency band may include tuning a mixer's local oscillator input to a frequency substantially in the center of the second frequency band. Further, in one embodiment, the processing direction for directing the processor to convert the analog signals may include processing digital signals through a series of digital up-conversion, digital down-conversion, and filtering of the digital signals.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Accordingly, the breadth and scope of the present invention should not be limited by any of the above-described exemplary embodiments, but should be defined only in accordance with the following claims and their equivalents.

What is claimed is:

1. A frequency translation module for a broadband multi-channel communication system, comprising:

a digital channel selection device configured to process respective digital signals corresponding to a plurality of analog signals, associated with a predefined frequency band, to generate a composite output of digital signals representative of the plurality of analog signals, wherein the digital channel selection device includes a plurality of mixers, a plurality of phase lock loop circuits, a decimation filter bank, and a filter; and a digital-to-analog (D/A) converter configured to translate the composite output to an analog signal output configured to be decodable by a receiver.

2. The frequency translation module of claim 1, further comprising:
an antenna configured to receive the plurality of analog signals, wherein the antenna includes a plurality of outputs, each output corresponding to at least a different satellite transmission frequency, polarization, or satellite orbital location.

3. The frequency translation module of claim 1, further comprising:
a plurality of antennas, each of the plurality of antennas being configured to receive a satellite signal from a different orbital location.

4. The frequency translation module of claim 1, wherein the plurality of analog signals are associated with a frequency spectrum compatible with the broadband multi-channel communication system.

5. The frequency translation module of claim 1, further comprising:
an analog signal converter configured to receive the plurality of analog signals, associated with the predefined frequency band, and to convert the plurality of analog signals into the respective digital signals.

6. The frequency translation module of claim 5, wherein the analog signal converter comprises a filter, a mixer and an analog-to-digital (A/D) converter configured to process an analog signal, from among the plurality of analog signals, whose frequency is associated with the predefined frequency band.

7. The frequency translation module of claim 6, wherein the filter comprises a bandpass filter.

8. The frequency translation module of claim 6, wherein a frequency of a local oscillator (LO) input of the mixer correlates to a frequency substantially in the center of the predefined frequency band.

9. The frequency translation module of claim 5, wherein the analog signal converter is a sigma-delta analog-to-digital converter or a flash analog-to-digital converter.

10. The frequency translation module of claim 1, wherein the decimation filter bank is configured to down-sample a digital output of a mixer to generate a second digital signal, and to filter the second digital signal to achieve a predefined frequency response and signal-to-noise ratio.

11. A method of switching channels on a broadband multi-channel communication system with a scalable switch architecture, comprising:
combining respective digital signals corresponding to a plurality of analog signals, associated with a predefined frequency band, to generate a composite output of digital signals, wherein the combining the respective digital signals includes,
down-sampling a digital signal from among the respective digital signals to generate a down-sampled digital signal, and
filtering the down-sampled digital signal to achieve a predefined frequency response and signal-to-noise ratio; and
converting the composite output to an analog signal output that is decodable by a receiver.

12. The method of claim 11, further comprising:
up-converting the analog signal output to a frequency decodable by the receiver.

13. The method of claim 11, further comprising:
receiving the plurality of analog signals associated with the pre-defined frequency band; and
converting the plurality of analog signals into the respective digital signals.

14. The method of claim 13, wherein the receiving the plurality of analog signals includes receiving a plurality of satellite broadcasts from at least one of a plurality of orbital locations, a plurality of polarizations, and a plurality of satellite transmission frequencies.

15. The method of claim 13, wherein the converting includes selecting an analog signal, from among the plurality of analog signals, that is associated with a frequency spectrum compatible with the broadband multi-channel communication system.

16. The method of claim 13, wherein the converting comprises:
filtering an analog signal, from among the plurality of analog signals, into a filtered analog signal using a bandpass filter;
mixing the filtered analog signal with a local oscillator (LO) signal having a predefined LO frequency to generate a mixed analog signal; and
digitizing the mixed analog signal using an analog-to-digital (A/D) converter.

17. The method of claim 16, wherein the mixing the filtered analog signal includes mixing the filtered analog signal with a LO signal having a frequency substantially in the center of the predefined frequency band.

18. The method of claim 11, wherein the combining includes generating a narrow band of output frequencies that contain channels of interest through a series of digital up-conversion, digital down-conversion, and filtering of the digital signal.

19. The method of claim 11, wherein the combining comprises combining the filtered down-sampled digital signal with a second filtered down-sampled digital signal to generate the composite output of digital signals.

20. A system for switching channels on a broadband multi-channel communication system with a scalable switch architecture, comprising:
a frequency translation module coupled to an antenna, wherein the frequency translation module is configured to receive signals through the antenna, and provide a plurality of analog signals associated with a predefined frequency band; and
a memory in communication with a processor configured to control the frequency translation module, the memory storing a plurality of processing instructions for directing the processor to:
combine respective digital signals corresponding to the plurality of analog signals associated with the pre-defined frequency band, and to generate a composite output of digital signals, wherein to combine the respective digital signals the processor is further directed to
down-sample a digital signal from among the respective digital signals to generate a down-sampled digital signal, and
filter the down-sampled digital signal to achieve a predefined frequency response and signal-to-noise ratio; and
translate the composite output to an analog signal output that is decodable by a receiver.

21. The system of claim 20, wherein the plurality of processing instructions further include instructions for directing the processor to up-convert the analog signal output to a frequency that is decodable by the receiver.

22. The system of claim 20, wherein the plurality of processing instructions for directing the processor further include instructions to combine the filtered down-sampled digital signal with a second filtered down-sampled digital signal to generate the composite output of digital signals.

* * * * *